US008352542B2

(12) United States Patent  
Stroffolino

(10) Patent No.: US 8,352,542 B2
(45) Date of Patent: Jan. 8, 2013

(54) METHOD AND SYSTEM FOR PROVIDING AN INTERACTIVE APPLICATION OVER A NETWORK

(75) Inventor: Philip J. Stroffolino, Sandy Springs, GA (US)

(73) Assignee: SeaChange International, Inc., Acton, MA (US)

( * ) Notice: Subject to any disclaimer, the term of this patent is extended or adjusted under 35 U.S.C. 154(b) by 310 days.

(21) Appl. No.: 12/555,599

(22) Filed: Sep. 8, 2009

(65) Prior Publication Data

US 2010/0064000 A1 Mar. 11, 2010

Related U.S. Application Data

(60) Provisional application No. 61/095,276, filed on Sep. 8, 2008.

(51) Int. Cl.
*G06F 15/16* (2006.01)
*G06F 15/173* (2006.01)
*A63F 9/24* (2006.01)

(52) U.S. Cl. ........ 709/203; 709/227; 709/228; 709/229; 463/9; 463/25; 463/30; 463/42

(58) Field of Classification Search .................. 709/203, 709/227–229; 463/9, 25, 30, 42
See application file for complete search history.

(56) References Cited

U.S. PATENT DOCUMENTS

| 5,738,583 | A | * | 4/1998 | Comas et al. ............... 463/40 |
| 6,152,824 | A | * | 11/2000 | Rothschild et al. ............. 463/42 |
| 6,203,427 | B1 | * | 3/2001 | Walker et al. .................. 463/16 |
| 6,264,559 | B1 | * | 7/2001 | Lawrence et al. ............... 463/40 |
| 6,496,981 | B1 | * | 12/2002 | Wistendahl et al. .......... 725/112 |
| 6,602,133 | B2 | * | 8/2003 | Chan ............................. 463/9 |
| 6,625,578 | B2 | * | 9/2003 | Spaur et al. .................. 705/14.5 |
| 7,464,381 | B1 |   | 12/2008 | Nickerson et al. |
| 7,523,158 | B1 |   | 4/2009 | Nickerson et al. |
| 2002/0034980 | A1 | * | 3/2002 | Lemmons et al. ............. 463/40 |
| 2006/0003831 | A1 | * | 1/2006 | Falciglia, Sr. .................. 463/20 |
| 2006/0229129 | A1 |   | 10/2006 | Jalava et al. |
| 2007/0155506 | A1 | * | 7/2007 | Malik ............................ 463/42 |
| 2008/0015023 | A1 | * | 1/2008 | Walker et al. .................. 463/42 |
| 2010/0022289 | A1 | * | 1/2010 | Menicou ....................... 463/14 |
| 2010/0298047 | A1 | * | 11/2010 | Gemelos et al. .............. 463/29 |

* cited by examiner

*Primary Examiner* — David Lazaro
*Assistant Examiner* — Farzana Huq
(74) *Attorney, Agent, or Firm* — Proskauer Rose LLP

(57) ABSTRACT

Described is a method of providing an interactive application over a network. Executable instructions to display foreground content and background content can be transmitted over a network to a client device. The client device can transmit data identifying a positional location of a user-selected element of the foreground content in the foreground display to a server. The server can determine a next state of the interactive application based on the current state of the interactive application and the positional location of the user-selected element. The server can transmit a next set of executable instructions causing the client device to manipulate one or more of the individual elements in the foreground display according to the next state of the interactive application.

8 Claims, 7 Drawing Sheets

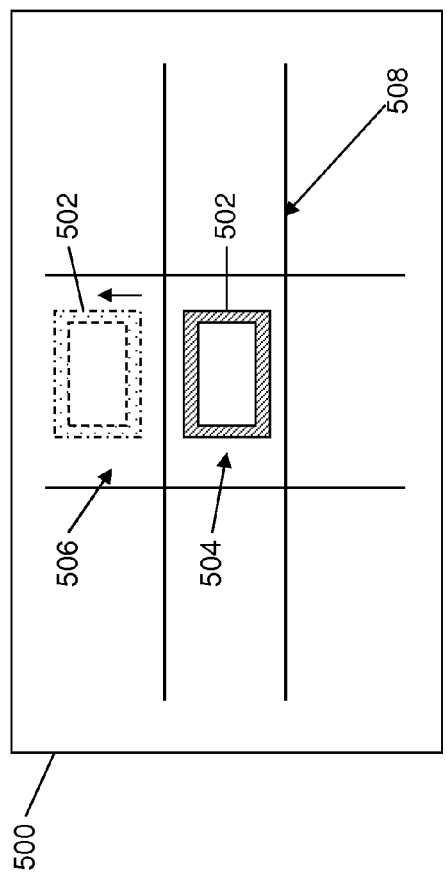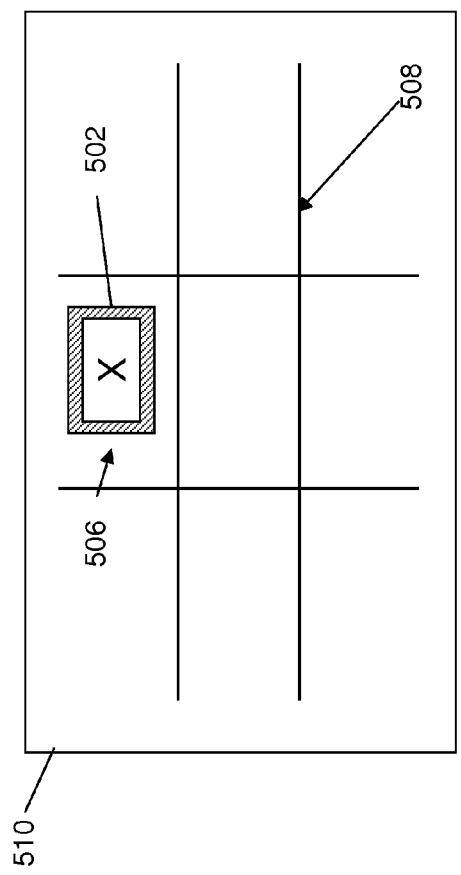

METHOD AND SYSTEM FOR PROVIDING AN INTERACTIVE APPLICATION OVER A NETWORK

RELATED APPLICATIONS

This application claims priority to and benefit of U.S. Provisional Patent Application No. 61/095,276, filed on Sep. 8, 2008, the entire contents of which are incorporated herein by reference.

FIELD OF THE INVENTION

The present invention, in general, relates to a method and system for providing an interactive application over a network, and in particular, to a client-server protocol that can reduce the network bandwidth required for each interactive application relative to prior stream-based interactive gaming systems.

BACKGROUND OF THE INVENTION

Conventional interactive applications that are provided over a network to a set top box include Video On Demand (VOD) applications that provide movies and television programming upon request. Typically, a viewer selects a program from a list and a corresponding request is sent over a network to a VOD server. The VOD server then streams the requested program back to the set top box for real-time playback. As VOD becomes increasingly popular, demand for other interactive applications, including interactive video games, is also becoming greater.

Interactive video games can be provided to subscriber households in a number of different ways. For example, stream-based, online gaming systems typically provide interactive video games to household set top boxes over the same network infrastructure as VOD. A gaming server executes an instance of a selected video game, captures frames of the game as it executes, converts the frames into video data and streams the video data down to the set top box for playback. User commands resulting from, e.g., remote control signaling are transmitted from the set top box over a reverse link back to the gaming server as input to the game in order to generate subsequent video segments.

SUMMARY OF THE INVENTION

Stream-based gaming systems can have several disadvantages. For example, streams delivering video gaming content consume the same amount of bandwidth as streams delivering VOD content. However, the fee that users are generally willing to pay to play stream-based video games is much less than that to watch a VOD movie. Furthermore, the amount of video data that fits in a video stream is much lower than for traditional VOD, making video streaming a less efficient delivery mechanism. Likewise, upstream network bandwidth requirements are also high because of the need to transmit all user commands to the gaming server for generation of subsequent video segments. For at least these reasons, the bandwidth utilization required for typical stream-based gaming systems is not efficient. Also, significant processing power can be necessary to handle the number of concurrent tasks, and network latency issues can result in a lack of visual responsiveness perceived by the user during his or her gaming experience.

Other methods of video on demand gaming can have similar problems. For example, locally executable games that are downloaded to a set top box require the set top box to have high memory capacity and processing power.

Accordingly, a system and method is disclosed for providing interactive applications, such as interactive video games, over a network infrastructure that avoids the network bandwidth issues typically associated with stream-based gaming systems and thus allowing for a significant increase in the number of gaming sessions that can be supported concurrently by a single gaming server.

According to one aspect, a method and system is disclosed for providing an interactive application over a network that respectively comprise the steps of, or structure for, transmitting foreground content and background content over a network to a client device, where the foreground and background content correspond to a current state of an interactive application; transmitting a set of executable instructions causing the client device to present the background content in a background display and individual elements of the foreground content in a foreground display that overlays at least a portion of the background display; receiving a key code from the client device over the network, where the key code comprises data identifying a positional location of a user-selected element of the foreground content in the foreground display; determining a next state of the interactive application based on the current state of the interactive application and the positional location of the user-selected element; generating and transmitting a next set of executable instructions causing the client device to manipulate one or more of the individual elements in the foreground display according to the next state of the interactive application. In particular, the next set of executable instructions can be a minimal set of rendering commands that transform the foreground display and background display from the current state to the next state of the interactive application.

The method and system can further comprise the steps of, or structure for, respectively, arranging the foreground display according to a grid comprising a plurality of grid tiles, each grid tile corresponding to a positional location of an individual element of the foreground content.

The method and system can further comprise the steps of, or structure for, respectively, transmitting a different set of foreground content and background content to the client device corresponding to the next state of the interactive application.

According to another aspect, a method and system is disclosed for providing an interactive application over a network that comprises the steps of, or structure for, receiving foreground content and background content over a network from a server, where the foreground and background content corresponding to a current state of an interactive application; executing a set of instructions from the server to present the background content in a background display and individual elements of the foreground content in a foreground display that overlays at least a portion of the background display; receiving navigational commands from a user and, in response, automatically causing a graphical selection indicator in the foreground display to move in one or more directions according to the received navigational signals; receiving a selection command from the user and, in response, transmitting a key code to the server over the network, where the key code comprises data identifying a positional location of a user-selected element of the foreground content in the foreground display; and executing a next set of instructions received from the server in response to transmission of the key code to manipulate one or more of the individual elements of the foreground content in the foreground display according to a next state of the interactive application. In particular, the next set of executable instructions can be a minimal set of rendering commands that transform the foreground display and background display from the current state to the next state of the interactive application.

The method and system can further comprise the steps of, or structure for, respectively, arranging the foreground display according to a grid comprising a plurality of grid tiles, each grid tile corresponding to a positional location of an individual element of the foreground content.

The method and system can further comprise the steps of, or structure for, respectively, receiving a different set of foreground content and background content to the client device corresponding to the next state of the interactive application.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A-5B are screen shots illustrating an exemplary interactive gaming application of TIC-TAC-TOE.

DETAILED DESCRIPTION

The following includes description of particular embodiments of the present invention, which is purely for the sake of understanding and not by way of any sort of limitation.

A system and method is disclosed for providing interactive applications, such as interactive video games, over a network infrastructure that avoids the network bandwidth issues typically associated with stream-based gaming systems and thus allowing for a significant increase in the number of gaming sessions that can be supported concurrently by a single gaming server.

According to particular embodiments, the interactive gaming system can include a gaming server and a gaming client. The gaming client is preferably a "thin client" that can render content on a display device in accordance with content and/or display instructions periodically downloaded from the gaming server; autonomously control the movement of a selection indicator (e.g. cursor) over the displayed content in response to user navigation commands (e.g. UP, DOWN, LEFT, RIGHT) from a remote control and/or other user input device; and/or transmit messages to the gaming server indicating the position of the selection indicator on the display in response to user selection commands (e.g., OK). In some embodiments, the gaming client does not maintain any information regarding the state of the game.

The gaming server can execute instances of a selected video game upon request and maintain the state of the game for each user or multi-user session. The gaming server can determine an initial state and/or subsequent states based on message from the gaming client that identify positional information relating to the location of a selection indicator (e.g., cursor) when a user selection occurs. In response to each message, the gaming server can generate and/or transmit a next set of executable instructions and/or content that the client device can use to manipulate the user's display according to the next state of the interactive application.

Figure 1:
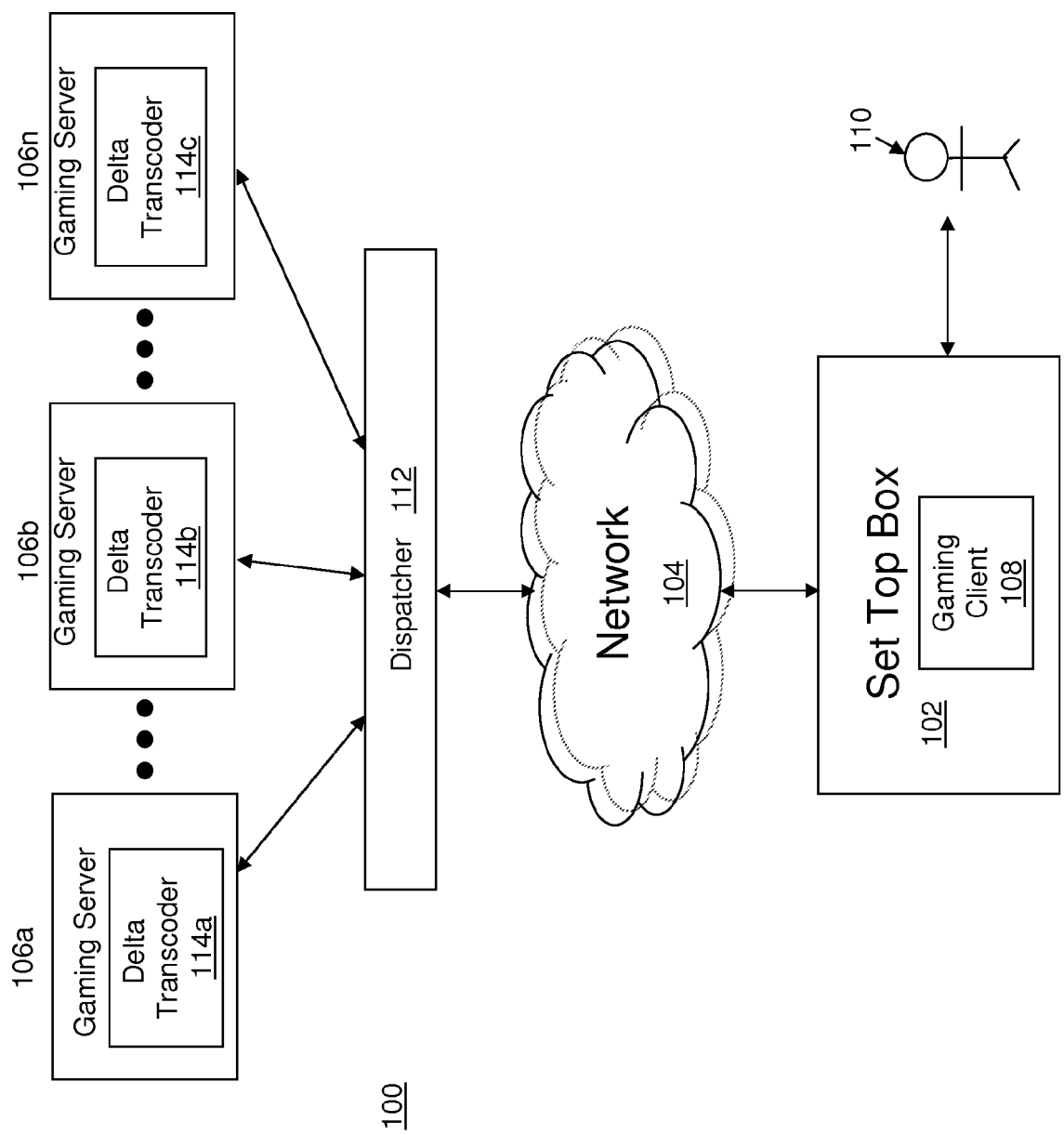
FIG. 1 is a block diagram showing components of an interactive gaming system according to one embodiment.

FIG. 1 illustrates a block diagram showing the components of an interactive gaming system 100 in accordance with some embodiments of the present invention. The interactive gaming system 100 includes a set top box 102, which, in turn, includes a gaming client 108 operatively connected over a network 104 to a dispatcher 112. The dispatcher 112 is operatively connected to one or more gaming servers 106a, 106b, ..., 106n, generally 106. Each gaming server can, respectively, include a delta transcoders 114a, 114b, ..., 114n, generally 114.

Figure 2:
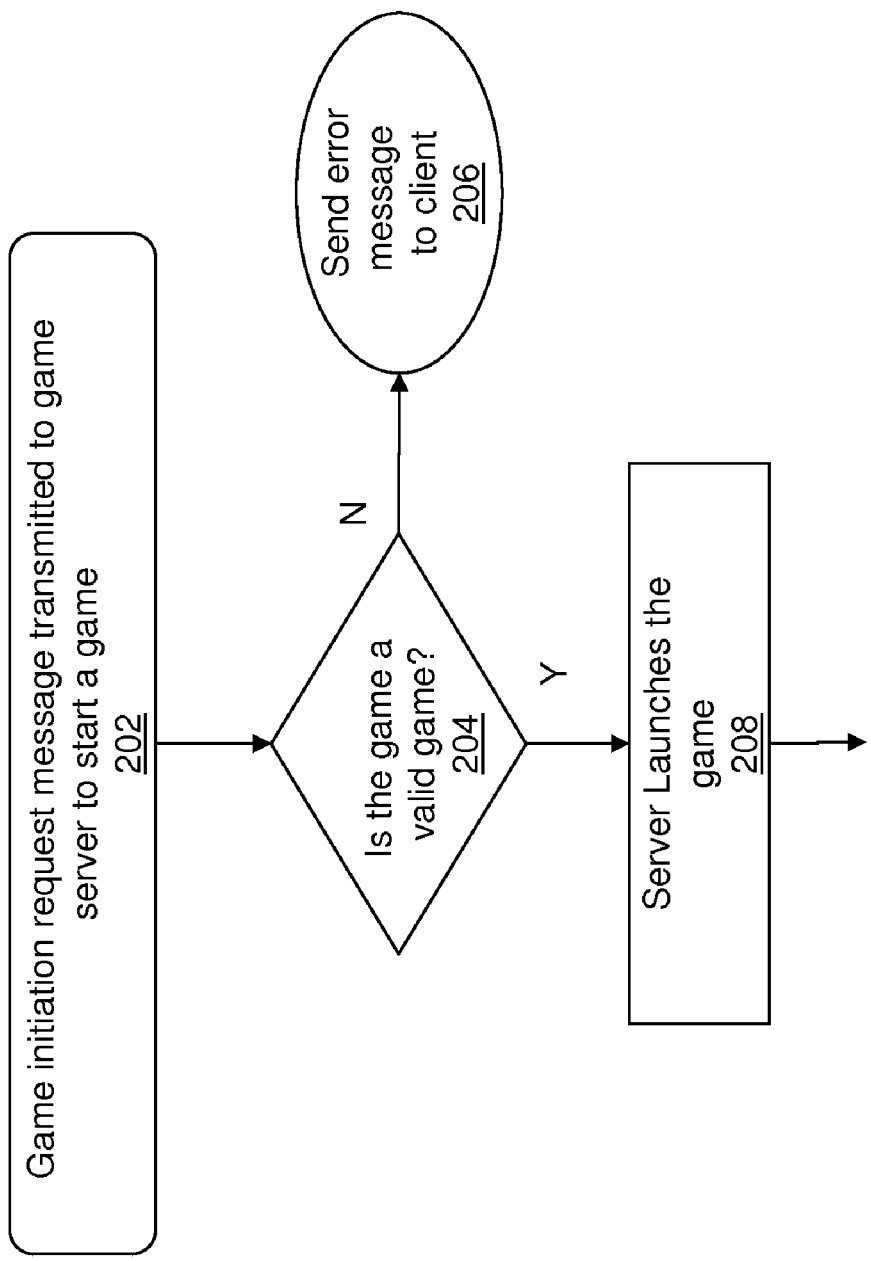
FIG. 2 is a flow diagram for initiating an instance of an interactive game application according to one embodiment.

FIG. 2 is a flow diagram 200 for initiating an instance of an interactive game application according to some embodiments. At step 202, to initiate a gaming session, a game initiation request for the game is delivered to the dispatcher 112. The game initiation request can originate from a standard electronic program guide that enables users to request interactive games in the same manner as requesting a VOD program. The game initiation request can include: a game identifier, address information that identifies the requesting set top box, and/or the set top box type. At step 204, the dispatcher 112 validates the game initiation request against a set of supported games. At step 210, if the game initiation request is determined to be valid, the dispatcher 112 routes the request to a gaming server 106, preferably one that is the least busy, to launch the game. Otherwise, at step 206, an error message is returned.

The gaming server 106 can support a number of different games and/or different game types, for example, card games (e.g., solitaire, poker, and/or hearts), word games (e.g., boggle, scrabble, and/or hangman), trivia games, board games (e.g., checkers and/or chess), match three games (e.g., Bejeweled and/or Big Kahuna Reef), and/or other games. Other non-game related applications can also be supported including banking, traffic and weather, and/or channel overlay applications.

Figure 3:
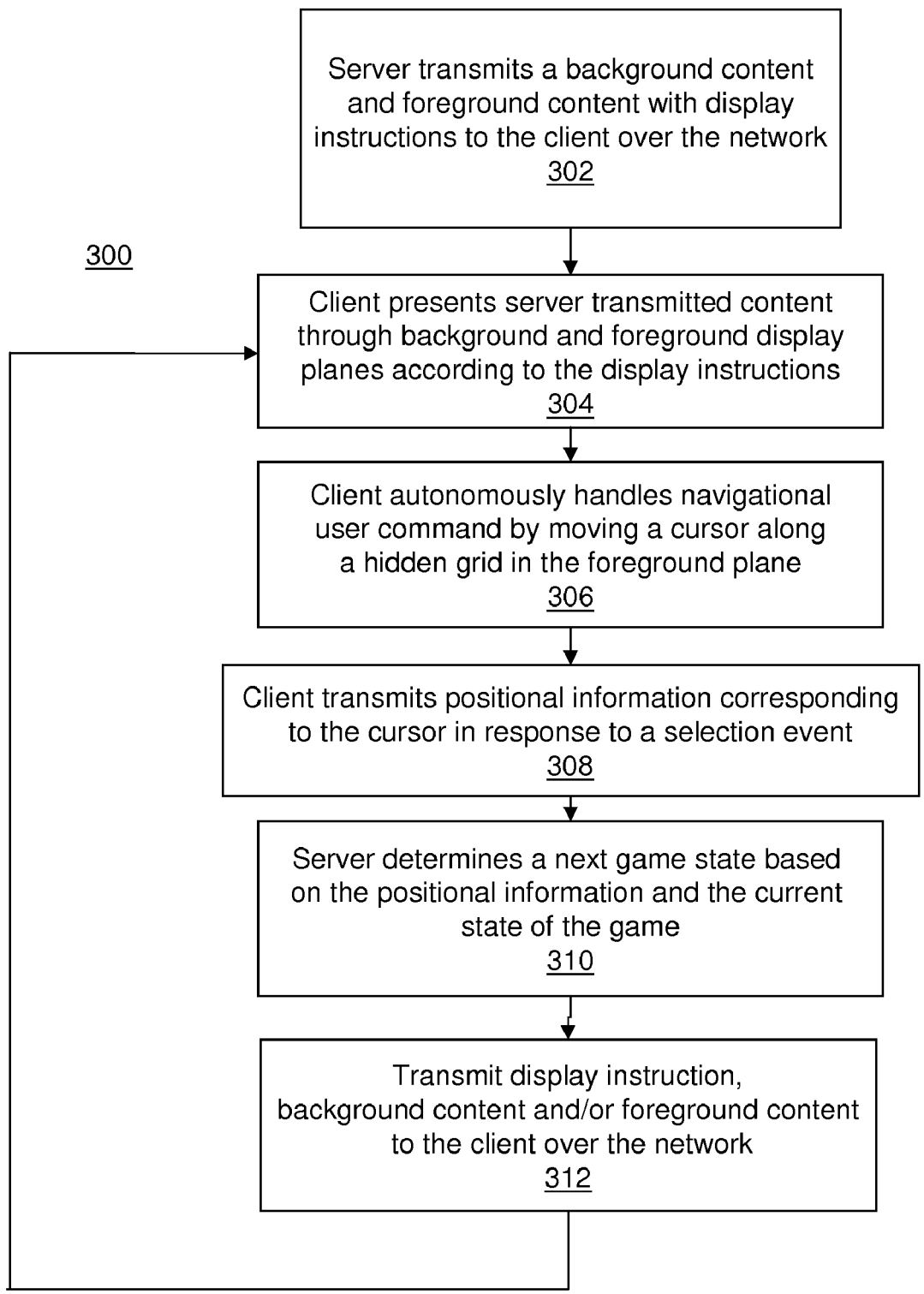
FIG. 3 is a flow diagram for communicating between a gaming client and gaming server during an interactive gaming session according to one embodiment.

FIG. 3 is a flow diagram 300 for communicating between the gaming client 108 and gaming server 106 during an interactive gaming session according to some embodiments. At step 302, when an interactive game is initially launched, the gaming client 108 can receive background content, foreground content, display instructions and/or audio data corresponding to an initial game state from the gaming server 106 over the network 104. The background content can be, for example, a full screen video background (e.g., a black and white chess board) or a partial-screen video update (e.g. an in-game banner advertisement). The background content can be MPEG, JPEG and/or other video or picture data types that can be received as VOD streams. The foreground content can include a number of individual elements of content (e.g., bit map).

At step 304, in accordance with the server display instructions, the gaming client 108 can display the individual elements of foreground content in a foreground overlay plane and the background content in a background plane, such that the contents of the foreground plane is superimposed on the background plane. For example, in a game of chess, the background content is the chess board and the foreground content includes the individual chess pieces.

At step 306, the gaming client 108 can receive and autonomously handle user commands from a remote control and/or other input device 110 to navigate a selection indicator (e.g., cursor) in the foreground overlay plane (e.g., UP, DOWN, LEFT, RIGHT). For such navigational commands, the gaming client 108 can update the display moving the cursor or other selection indicator in the desired direction without sending messages to the gaming server 106. More generally, given a game (e.g., a board game) where a player(s) interacts by selecting grid locations and acting upon them, the majority of key presses may be associated with navigation to a specific grid location (e.g., specific column and row) rather than associated with an action. These navigational key presses can advantageously be processed locally at the gaming client 108 without requiring round trip communications with the gaming server 106. Processing of navigation actions locally can advantageously minimize latency, conserve upstream network bandwidth, and/or avoid the unnecessary consumption of gaming server 106 resources for simple actions that can be easily handled by the gaming client 108.

In some embodiments, a grid can be defined within the foreground overlay plane. Such a grid, which can be optionally hidden, can be used to navigate the selection indicator (e.g., cursor) within the foreground plane. For example, each tile of the grid can be defined by a set of grid coordinates and a rule indicating valid moves from that space. Furthermore, the gaming server 106 can use grid coordinates in its display instructions to aid in the insertion, deletion or replacement of foreground content within the foreground plane according to grid coordinates. For example, display instructions can fill a grid tile of a specified width and height with a specified color.

At step 308, the gaming client can receive a user command from the remote control and/or other input device 110 corresponding to a selection event in the foreground overlay plane (e.g., user depressed OK button on remote control). In response to the selection command, the gaming client 108 can send a key code to the gaming server 106 over the network 104. The key code can include data identifying positional information corresponding to the selection indicator in the foreground plane when the selection event occurred. For example, the position information can include the grid coordinates of a tile associated with the selection event. The key code can also include address information that identifies the set top box 102, a game identifier and/or the set top box type.

At step 310, the gaming server 106 can determine the next game state based on the positional information corresponding to the selection indicator and the current state of the game. For example, in a game of chess, the gaming server can maintain a data structure representing the current state of chess pieces as positioned on a chessboard. Upon a selection event, the gaming server 106 can receive a message indicating the positional information corresponding to the selection indicator at the time of the event. The gaming server then can map this positional information to a selected chess piece on the chess board. As a result, the next state can require that updates be made to the foreground display such as, for example, highlights identifying the valid moves for that chess piece. The display instructions to manipulate the foreground content corresponding to this next state can be generated and transmitted at step 312.

Specifically, at step 312, the gaming server 106 can generate and transmit a next set of executable display instructions causing the gaming client to manipulate one or more of the individual elements in the foreground display according to the next state of the interactive application. This step can also include the transmission of new foreground and/or background content to the gaming client 108. The display instructions can also replace background content and/or replace a part of the background content. The display instructions can also cause the set top box 102 to play sounds and/or video clips that are stored on the gaming client 108. The process can return to step 304 and continuously repeats until the game is terminated or suspended by the user.

According to some embodiments, the gaming server 106 can include a delta transcoder 114, which can be aware of the gaming client's 108 rendering state and/or capabilities. In some embodiments, the delta transcoder 114 can be an encoding layer that takes the gaming client's 108 known rendering state (e.g., current foreground content, current background content and/or display instructions that have already been sent to the gaming client 108) and the game's desired next-state to be presented, and can generate and/or determine an optimal set of commands to be processed by the gaming client 108 to transform its current state to the new desired state. In addition, as a layered unit the delta transcoder 114 advantageously can allow for less complexity to be added to individual games or require that games be aware of any protocols used in the transmission of instructions.

The optimal set of commands can include the minimum set of new foreground content instructions, new background content instructions and/or new display instructions that need to be sent to the gaming client 108 in order to cause the display to reflect the results of the actions associated with the key code. These commands can include, in part, full and/or partial updates to the background layer and/or presentation of wholly new images on the foreground layer. In some embodiments, the commands can cause parts of the foreground layer to be duplicated and/or moved and can remap colors on the foreground layer. The set of transmitted commands can also include triggers to present sound effects and/or to pause for some specified amount of time.

For example, consider the commands required to generate the initial set of pieces of a chess game, which are listed in Table I.

TABLE I

| | |
|---|---|
| draw black rook | copy black pawn, recolor to present white pawn |
| draw black knight | copy white pawn (7X) |
| draw black bishop | copy black rook, recolor to present white rook |
| draw black queen | copy black knight, recolor to present white knight |
| draw black king | copy black bishop, recolor to present white bishop |
| copy black knight | copy black queen, recolor to present white queen |
| copy black bishop | copy black king, recolor to present white king |
| copy black rook | copy white bishop |
| draw black pawn | copy white knight |
| copy black pawn (7X) | copy white rook |

Given that a "draw new" command can be the largest instruction, as it can require bitmap data to be transmitted, in this example, the delta transcoder 114 can manage to efficiently draw 32 chess pieces with only 6 "draw new" commands. When later a single chess piece needs to be moved, the transmitted commands can be even smaller—there is no need to redraw the entire screen. Not only can the delta transcoder 114 dramatically reduce downstream bandwidth, but it can ensure that a client device is sent as small a set of instructions to process as possible, for faster rendering.

Continuing the chess game example, the game action request to move a pawn is next considered. The delta transcoder 114 can determine that background content does not need to be sent because the chess board has not been changed. The delta transcoder 114 can also determine that foreground content does not need to be sent because the pawn already exists in the game, and/or that a display instruction of a move command needs to be sent because the action request is to move the pawn. In another example, assume the game is chess and the game action request is to insert the queen. The delta transcoder 114 can determine that the individual foreground content of a queen needs to be sent. The delta transcoder 114 can also determine that a display instruction of insert needs to be sent, but that the background content does not need to be sent because the chess board itself has not been changed.

The gaming server 106 and the delta transcoder 114 can run multi-user games for one or more users playing from the same set top box 102 and/or one or more users playing from different set top boxes. When a user interacts with a game, the game can have the option to choose to generate an animation, not just a single new screen. For example, a game can present a brief sequence illustrating falling/exploding gems in a match 3 game, a sequence of images communicating opponent actions in a poker game, and/or an animation showing a chess piece's available moves and/or an opponent's move.

Figure 4:
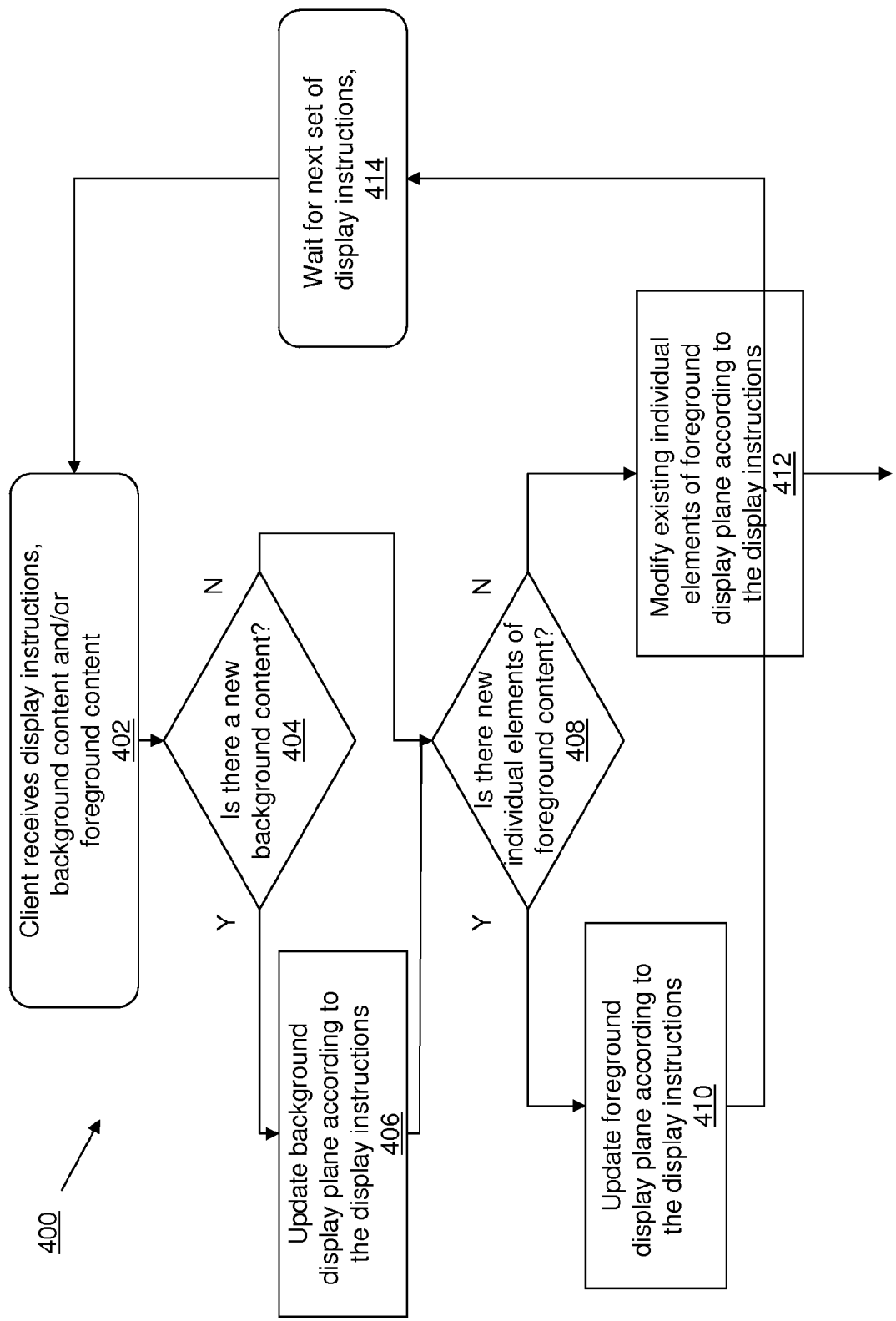
FIG. 4 is a flow diagram for updating a display with the state of an instance of interactive video game maintained at the gaming server according to one embodiment.

FIG. 4 is a flow diagram 400 for updating a display with the state of an instance of interactive video game maintained at the gaming server according to some embodiments. The gaming client 108 can receive display instructions, background content and/or foreground content (Step 402). The gaming client 108 can determine if there is new background content (Step 404). If it is determined that there is new background content, then the gaming client 108 can update a background display plane according to the display instructions (Step 406). Otherwise, the gaming client 108 can determine if there are new individual elements of foreground content (Step 408). If it is determined that there is new individual elements of foreground content, then the gaming client 108 can update the foreground plane according to the display instructions (Step 410). Otherwise, the gaming client 108 can modify the position of existing individual elements of foreground content in the foreground overlay plane according to the display instructions (Step 412). For example, the display instructions can include instructions to insert, move or delete particular elements of foreground content identified by display coordinates, such as the grid coordinates of a grid tile hidden in the foreground plane. Next, the gaming client 108 can wait for the next set of display instructions from the gaming server 106 (Step 414).

FIGS. 5A-5B are screen shots 500 and 510 illustrating an exemplary interactive gaming application of tic-tac-toe. Specifically, FIG. 5A illustrates user navigation of a cursor during a tic-tac-toe game. A hidden grid of navigable tiles for the tic-tac-toe game (as discussed above in connection with FIG. 1) can be provided to the gaming client 108 from the gaming server 106 over the network 104. The grid can have location data and/or command location data. Each location data can indicate display coordinates and thus position of a tile of the grid. The command location data can indicate the next grid position of a tile dependant on the user command. For example, if the user inputs a command to move the cursor 502 from the middle square 504 to the top middle square 506, by pushing up on a remote control, the gaming client 108 can use the grid to execute the command. The gaming client 108 can find the current cursor position on the grid. Next, the gaming client 108 can find the command location on the grid, the location the cursor 502 should move to for the current user command. Next, the gaming client 108 can move the cursor 502 to the command location. In some embodiments, the gaming client 108 can move the cursor 502 from the middle square 504 to top middle square 506 without the gaming client 108 sending a message to the gaming server 106 to execute the move. This can greatly reduce network traffic and user latency.

FIG. 5B is another screen shot 510 illustrating the exemplary interactive gaming application of FIG. 5A. Specifically, FIG. 5B illustrates a selection event during a tic-tac-toe game. Once the user selects a grid tile the gaming client 108 can send a message to the gaming server 106 to execute the selection. The cursor 502 can be positioned in the top middle square 506. The user can select the square, for example, by pressing a button on a joystick. The gaming client 108 can determine the current location by finding the cursor position on the grid. The gaming client 108 can send a message including the cursor position on the grid to the gaming server 106 over the network 104. The gaming client 108 can determine that an "x" should be placed on the tic-tac-toe board 508 at the cursor position. The gaming server 106 can send an individual element foreground data of an "x", and an insert command to insert the "x" onto the tic-tac-toe board 508 at the current location.

Figure 6:
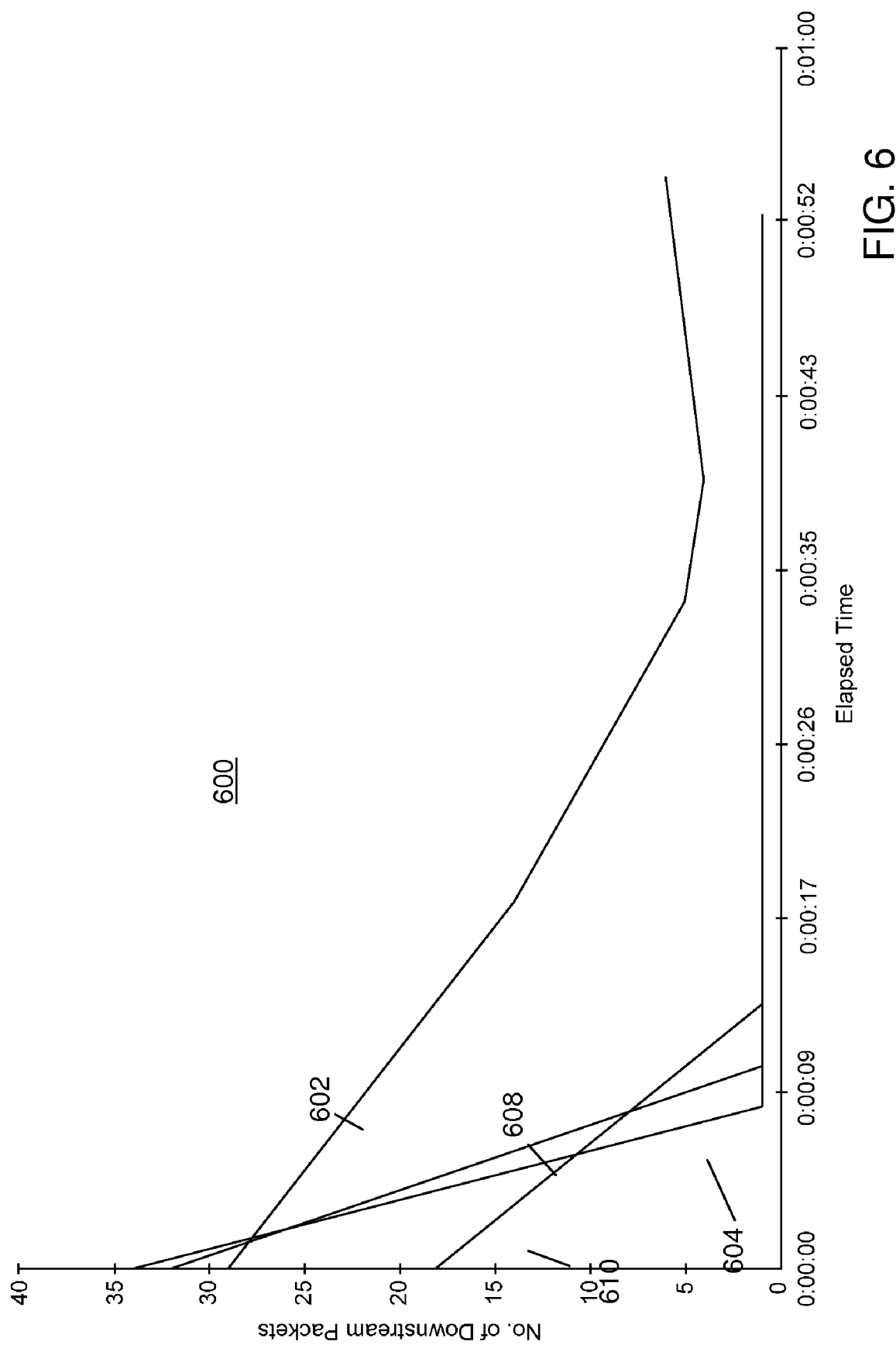
FIG. 6 is a graph illustrating a number of packets transmitted over a network for downstream transmission as a function of game elapse time for exemplary games.

Accordingly, some embodiments of the gaming system and method can advantageously reduce the network bandwidth required for each interactive application relative to prior stream-based interactive gaming systems. Such efficient use of network bandwidth is particularly advantageous for cable television networks that support a limited number of upstream and downstream channels with each upstream channel enabling upstream communications at very low bit rates (typically 12 kb/s). FIG. 6 is a graph 600 illustrating a number of packets transmitted over a network for downstream transmission as a function of game elapse time for exemplary games, namely Chess, SeaWords, Tex. Hold 'Em, and Seasweeper.

Specifically, referring to the network transmission profile 608 that corresponds to an interactive user session of chess, thirty-two (32) data packets are initially transmitted downstream over a network from a gaming server to a gaming client in order to initiate a game of chess. These 32 packets comprise the initial background content corresponding to a chess board, individual elements of foreground content corresponding to the chess pieces and a set of display instructions that is used by the gaming client to position the individual chess pieces on the foreground overlay plane. As play of the game progresses, the gaming server only needs to transmit message packets to the gaming client indicating the position(s) to move the individual chess pieces in the foreground plane. The gaming server does not need to transmit the background or foreground content again. Thus, as shown in FIG. 6, the number of packets transmitted downstream over the network in response to each selection event decreases to one (1) packet per event, thus significantly reducing the amount of traffic over the network.

Furthermore, because the gaming client autonomously handles the user navigation commands with respect to movement of a selection indicator in the foreground plan, upstream communications from the gaming client are limited to messages responsive to a selection event that requires an update to the state of the game at the server and a corresponding change to the user's display. For at least this reason, the number of upstream packets transmitted from the gaming client is reduced relative to stream-based games that require constant upstream communication.

Similarly, with respect to the network transmission profile 602 for an interactive video game of Texas Hold 'Em, twentynine (29) packets are initially transmitted to the gaming client comprising the background content corresponding to a poker table, individual elements of the foreground content corresponding to an initial set of playing cards and display instructions for the initial placement the cards on the table. As play of the game progresses, the gaming server transmits additional packets comprising further display instructions as well as new elements of foreground content corresponding to additional playing cards. As shown in FIG. 6, the transmission of packets trends in a downward direction after the initial packet transmission initiating the first game. Once a hand is completely played, the gaming server does not need to re-transmit all of the background content and foreground content to start a new game. The gaming server only transmits the foreground content required to display cards with a new value.

The network transmission profiles of the Seawords 610 and Seasweeper 604 are similar to that of chess in that there is an initial download of background and foreground content and then subsequent packet transmissions are limited to instructions for the insertion, deletion or movement of individual elements of foreground content in the foreground overlay plane. According to a particular embodiment of the gaming system, the network transmission profile resulting from use of these games are shown in Table II below.

TABLE II

|  | Chess | Seasweeper | SeaWords | Texas Hold 'Em |
|---|---|---|---|---|
| Total Upstream Packets | 69 | 127 | 119 | 177 |
| Total Downstream Packets | 102 | 160 | 136 | 641 |
| Total Game Length | 10 m:47 s | 4 m:40 s | 5 m:38 s | 19 m:15 s |
| Average Time Between Requests | 9.43 s | 2.2 s | 2.73 s | 6.5 s |
| Average Response Size (# of packets) | 1.48 | 1.26 | 1.14 | 3.6 |

Figure 7:
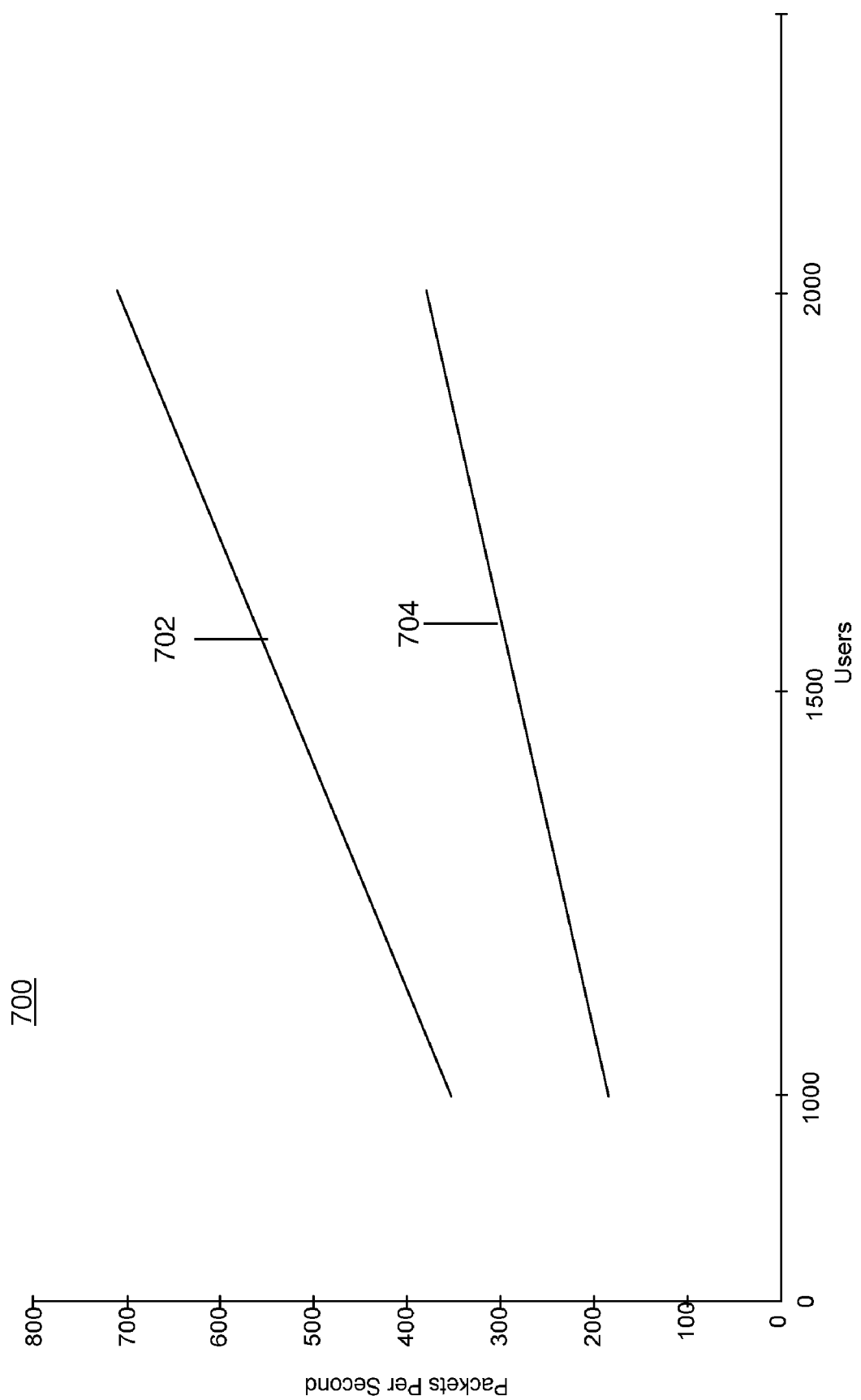
FIG. 7 is a graph illustrating a sample of upstream and downstream traffic as a function of the number of online players engaging with an embodiment of the gaming system over a network.

FIG. 7 is a graph 700 illustrating a sample of upstream and downstream traffic as a function of the number of players engaging with an embodiment of the gaming system over a network. Upstream traffic 704 occurs when gaming clients send messages over the network to the gaming server. Downstream traffic 702 occurs when the gaming server sends messages over the network to the gaming client. Specifically, the graph illustrates the number of upstream packets per second corresponding to a different numbers of simultaneous players as shown in Table III.

TABLE III

|  | 1000 Players | 1500 Players | 2000 Players |
|---|---|---|---|
| Upstream Packets Per Second | 191.75 | 287.63 | 383.5 |
| Downstream Packets Per Second | 358.58 | 537.87 | 717.16 |

As illustrated from the table above, embodiments of the gaming system can facilitate scaling in the number of gaming sessions, and thus players, that can be supported concurrently by a single gaming server without significant increases in traffic and network bandwidth utilization.

The above-described techniques can be implemented in digital electronic circuitry, or in computer hardware, firmware, software, or in combinations of them. The implementation can also be in another form that is not electronic in nature but performs the same outcome. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network.

Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function" as used herein mean, but are not limited to, a software or hardware component which performs certain tasks. A module may advantageously be configured to reside on addressable storage medium and configured to execute on one or more processors. A module may be fully or partially implemented with a general purpose integrated circuit (IC), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

While this invention has been particularly shown and described with references to preferred embodiments thereof, it will be understood by those skilled in the art that various changes in form and details may be made therein without departing from the scope of the invention encompassed by the appended claims.

What is claimed:

1. A computerized method of providing an interactive application over a network, comprising:
    transmitting, by a server device, foreground content and background content over a network to a client device, the foreground and background content corresponding to a current state of an interactive application;
    transmitting, by the server device, a set of executable display instructions that direct the client device to present the background content in a background display and individual elements of the foreground content in a foreground display that overlays at least a portion of the background display;
    receiving, by the server device, a key code from the client device over the network, the key code comprising data identifying a positional location of a user-selected element of the foreground content in the foreground display;
    determining, by the server device, a next state of the interactive application based on the current state of the interactive application and the positional location of the user-selected element;
    obtaining, by the server device, information corresponding to a rendering state of the client device, the rendering state including the foreground content, the background content and the display instructions previously transmitted to the client device; and
    generating and transmitting, by the server device, a minimum set of executable display instructions, foreground content and background content based on the rendering state that causes the client device to transform one or more of the foreground display and the background display from the current state to the next state of the interactive application.

2. The method of claim 1 wherein the interactive application is a video game.

3. The method of claim 1 further comprising arranging the foreground display according to a grid comprising a plurality of grid tiles, each grid tile corresponding to a positional location of an individual element of the foreground content.

4. A computerized method of providing an online interactive application over a network, comprising:
    receiving, by a client device, foreground content and background content over a network from a server device, the foreground and background content corresponding to a current state of an interactive application;
    executing, by the client device, a set of executable display instructions from the server device to present the background content in a background display and individual elements of the foreground content in a foreground display that overlays at least a portion of the background display;
    receiving, by the client device, navigational commands from a user and, in response, automatically causing a graphical selection indicator in the foreground display to move in one or more directions according to the received navigational signals without transmitting any messages to the server device;
    receiving, by the client device, a selection command from the user and, in response, transmitting, by the client device, a key code to the server device over the network, the key code comprising data identifying a positional location of a user-selected element of the foreground content in the foreground display; and
    executing, by the client device, a minimum set of executable display instructions, foreground content and background content received from the server device in response to transmission of the key code to transform one or more of the foreground display and the background display from the current state to the next state of the interactive application;
    wherein the minimum set of executable display instructions, foreground content and background content is generated by the server device based a rendering state of the client device, the rendering state including the foreground content, the background content and the display instructions previously transmitted to the client device by the server device.

5. The method of claim 4 wherein the interactive application is a video game.

6. The method of claim 4 further comprising arranging the foreground display according to a grid comprising a plurality of grid tiles, each grid tile corresponding to a positional location of an individual element of the foreground content.

7. A computer program product, tangibly embodied in a non-transitory computer readable storage device, for providing an interactive application over a network, including instructions being operable to cause a server device to:
    transmit foreground content and background content over a network to a client device, the foreground and background content corresponding to a current state of an interactive application;
    transmit a set of executable display instructions that direct the client device to present the background content in a background display and individual elements of the foreground content in a foreground display that overlays at least a portion of the background display;
    receive a key code from the client device over the network, the key code comprising data identifying a positional location of a user-selected element of the foreground content in the foreground display;
    determine a next state of the interactive application based on the current state of the interactive application and the positional location of the user-selected element;
    obtain information corresponding to a rendering state of the client device, the rendering state including the foreground content, the background content and the display instructions previously transmitted to the client device; and
    generate and transmit a minimum set of executable display instructions, foreground content and background content based on the rendering state that causes the client device to transform one or more of the foreground display and the background display from the current state to the next state of the interactive application.

8. A computer program product, tangibly embodied in a non-transitory computer readable storage device, for providing an interactive application over a network, including instructions being operable to cause a client device to:
    receive foreground content and background content over a network from a server device, the foreground and background content corresponding to a current state of an interactive application;
    execute a set of executable display instructions from the server device to present the background content in a background display and individual elements of the foreground content in a foreground display that overlays at least a portion of the background display;

receive navigational commands from a user and, in response, automatically causing a graphical selection indicator in the foreground display to move in one or more directions according to the received navigational signals without transmitting any messages to the server device;

receive a selection command from the user and, in response, transmit a key code to the server device over the network, the key code comprising data identifying a positional location of a user-selected element of the foreground content in the foreground display; and execute a minimum set of executable display instructions, foreground content and background content received from the server device in response to transmission of the key code to transform one or more of the foreground display and the background display from the current state to the next state of the interactive application;

wherein the minimum set of executable display instructions, foreground content and background content is generated by the server device based on a rendering state of the client device, the rendering state including the foreground content, the background content and the display instructions previously transmitted to the client device by the server device.

* * * * *